United States Patent [19]

Hatano et al.

[11] Patent Number: 4,549,287
[45] Date of Patent: Oct. 22, 1985

[54] SYSTEM FOR RECORDING AND PLAYING BACK INFORMATION WITH MAGNETO-OPTICAL DISK MEMORY USING RECORD AND READOUT LIGHT BEAMS OF DIFFERENT WAVELENGTHS

[75] Inventors: Hideki Hatano; Norikiyo Tajiri; Sakashi Ōtaki; Shigeru Kato, all of Tokorozawa, Japan

[73] Assignee: Pioneer Electronic Corporation, Tokyo, Japan

[21] Appl. No.: 405,312

[22] Filed: Aug. 5, 1982

[30] Foreign Application Priority Data

Aug. 6, 1981 [JP] Japan .................. 56-123223

[51] Int. Cl.[4] .............................................. G11B 7/00
[52] U.S. Cl. .................................. 369/45; 369/121; 369/13; 360/114
[58] Field of Search ............... 369/13, 100, 110–112, 369/44–46, 121–122; 360/59, 114; 365/121, 122

[56] References Cited

U.S. PATENT DOCUMENTS

| | | | |
|---|---|---|---|
| 3,715,740 | 2/1973 | Schmit | 360/59 |
| 3,731,290 | 5/1973 | Aagard | 360/59 |
| 3,969,576 | 7/1976 | Boonstra et al. | |
| 4,085,423 | 4/1978 | Tsunoda et al. | 369/45 |
| 4,275,275 | 6/1981 | Bricot et al. | 369/44 |
| 4,290,122 | 9/1981 | Bates et al. | 369/45 |
| 4,403,318 | 9/1983 | Nagashima et al. | 369/121 |

FOREIGN PATENT DOCUMENTS

| | | | |
|---|---|---|---|
| 2652790 | 6/1977 | Fed. Rep. of Germany | |
| 56-61054 | 5/1981 | Japan | 369/13 |
| 56-137538 | 10/1981 | Japan | 369/13 |

OTHER PUBLICATIONS

Imamura et al, Japanese Journal of Applied Physics, vol. 19, No. 12, 12/80, pp. L731–L734.

Primary Examiner—Robert L. Richardson
Attorney, Agent, or Firm—Fleit, Jacobson, Cohn & Price

[57] ABSTRACT

Disclosed is a system for recording and playing back information utilizing a magneto-optical disc memory having a vertical magnetization film on and from which the information is recorded and read out by an optical means. In order to simplify the construction of the system, an optical system including an objective lens and a tracking mirror is used both as a part of an optical path of a recording light beam and a part of an optical path of a readout light beam. The wavelengths of the recording light beam and the readout light beam are selected to be different so that the light beams are easily discriminated in the optical system.

3 Claims, 6 Drawing Figures

SYSTEM FOR RECORDING AND PLAYING BACK INFORMATION WITH MAGNETO-OPTICAL DISK MEMORY USING RECORD AND READOUT LIGHT BEAMS OF DIFFERENT WAVELENGTHS

BACKGROUND OF THE INVENTION

1. Field of the Invention

The present invention relates to a system for recording and playing back information, and more specifically to a system which utilizes a recording medium having magneto-optical characteristics.

2. Description of the Prior Art

In recent years, recording systems have been proposed wherein information is recorded and played back by using a so-called "magneto-optical disc memory". The magneto-optical disc memory includes a base which is made of a transparent material such as glass or a plastic, and a so-called "vertical magnetization film" which is formed thereon and is used as the recording medium having magneto-optical characteristics.

An amorphous alloy thin film of several microns thick is an example of a "vertical magnetization film" in which the direction of magnetization is perpendicular to the surface of the film.

Recording of information on the amorphous thin film takes place in a manner such that the orientation or the direction of magnetization of portions of the amorphous alloy thin film, which is initially uniformally magnetized in a preselected direction, is turned over by heating those portions above the Curie temperature or a compensation temperature while applying a relatively weak bias magnetic field. Generally, a laser beam digitally modulated by a signal to be recorded is applied on the amorphous thin film to heat those portions.

More specifically, the amorphous alloy thin film, which was previously downwardly (corresponding to the binary "0" signal) magnetized, is subjected to a weak upwardly biased field, while only those portions of the thin film on which the "1" signal is to be recorded are applied with a laser beam so as to raise the temperature of those portions above the Curie temperature or a compensation themperature, thereby causing a change in the direction of magnetization. Once the direction of magnetization is changed by the above-described process, it will not be changed by the bias magnetic field under the condition of room temperature.

Gadlinium Cobalt (GdCo) and Gadlinium Terbium Iron (GdTbFe) are examples of amorphous materials for the thin film. In the case of Gadlinium Terbium Iron, the power level of the laser beam required to change to magnetization direction is less than several mω, wherein the density of the recorded information is around 5 million bits per square centimeter.

The read out of information recorded on the magneto-optical disc memory takes place by applying a readout laser beam on the surface of the vertical magnetization film and the recorded signal is reproduced by utilizing the magnetic Kerr effect, which is an interaction between the magnetization of a substance and a light beam. When a linearly polarized laser beam is reflected by the magnetized thin film, the plane of polarization is rotated in a direction which is determined by the direction of the magnetization. Therefore, the information recorded on the vertical magnetization film is read out by detecting the direction of rotation of the plane of polarization of the reflected laser beam by means of an analyser.

In this way, recording and reading out of information take place in a recording and playing back system which has a magneto-optical disc memory as the recording medium.

This type of recording and playing back system, however, tends to be large-scaled because of the provision of both of a recording optical system and a playing back optical system. Furthermore, it may result in an increase in the cost of those systems.

SUMMARY OF THE INVENTION

An object of the invention is therefore to provide a system for recording and playing back information with a magneto-optical recording medium which is relatively small sized and less expensive than those presently known.

According to the present invention, the system for recording and playing and information uses a magneto-optical disc memory which is provided with a source of a recording beam and a source of a reading out beam whose frequency is different from that of the recording beam. With this feature, an optical system further includes an objective lens and a focussing and tracking unit which are part of a recording optical path and a part of reading out optical path.

According to another aspect of the present invention, the frequency of the reading out beam is selected higher than that of the recording beam so that the recording beam spot is sufficiently larger than the reading out beam spot, thereby ensuring a maximum degree of modulation in the read-out signal.

The foregoing and other objects and advantages of the invention will become more clearly understood from the following description taken in conjunction with the accompanying drawings.

DETAILED DESCRIPTION OF THE PREFERRED EMBODIMENT

Figure 1:
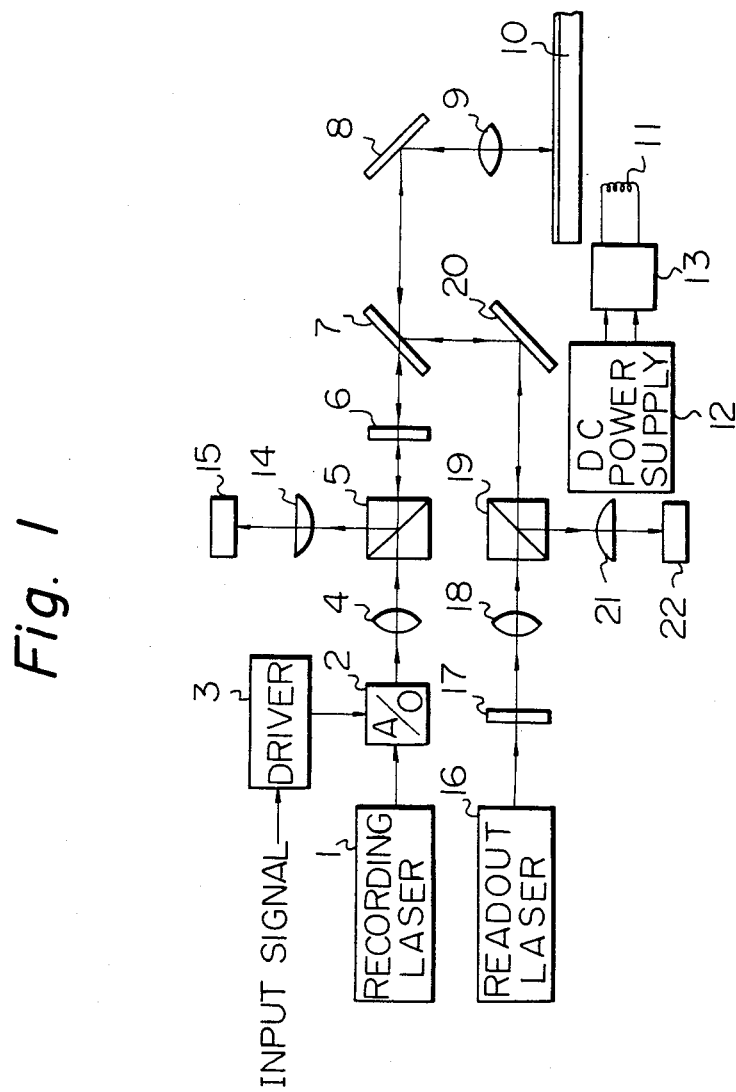
FIG. 1 is a schematic diagram of an embodiment of the present invention.

Reference is first make to FIG. 1 wherein a first embodiment of the present invention is illustrated.

In FIG. 1, a recording laser beam of a wavelength $\lambda_1$ is produced by a recording laser source 1 and fed to an A/O (Acoustic Optical) modulator 2 where the recording laser beam is modulated by an output signal of a driver 3 which receives a signal corresponding to the information to be recorded. The output beam of the A/O modulator 2 passes through a diversion lens 4, beam splitter 5, λ/4 plate 6, and a dichroic mirror 7. The beam thus is formed into a recording beam spot, and is focused on a magneto-optical disc 10 by means of a tracking mirror 8, a tangential mirror (not shown), and an objective lens 9. A coil 11, for generating a bias magnetic field, is disposed directly beneath the portion of the disc 10 at which the recording laser beam is focused, and is fed a DC voltage from a DC voltage source 12 via a polarity switching device 13.

The information is thus recorded on the disc 10 in the form of a change in the magnetic polarity which occurs when a portion of the disc 10 is heated above the Curie temperature by the recording laser beam.

During recording, a reflection beam of the recording beam enters into the objective lens 9 and passes through the tangential mirror, the tracking mirror 8, the dichroic mirror 7, and the λ/4 plate 6. At the beam splitter 5, the reflection beam from the λ/4 plate 6 is directed to a cylindrical lens 14 through which the reflection beam is applied to a light detector 15. An output signal of the light detector 15 is used for a focus servo control of the objective lens 9 so that the recording laser beam is correctly focused on the disc 10.

The system is also provided with a source 16 of a laser beam which produced a readout laser beam, the wavelength $\lambda_2$ thereof being shorter than that $\lambda_1$ of the recording laser beam.

The readout laser beam passes through a diffraction lattice 17, a diversion lens 18 and a beam splitter 20, and is directed to the dichroic mirror 7 by a mirror 20. At the dichroic mirror 7, the readout laser beam is directed to the tracking mirror 8 so that the readout laser beam is focused on the disc 10 by means of the objective lens 9.

The reflection of the readout laser beam travels the same path as does the incident beam, until it is received by the beam splitter 19, at which the reflection beam is directed to a light detector 22 via a cylindrecal lens 21.

Due to the magnetic Kerr effect, the plane of polarization of the reflection beam is rotated in a direction which is determined by the direction of magnetization of the vertical magnetization film. Therefore, the signal recorded on the disc 10, in the form of the direction of magnetization, can be reproduced by detecting the reflection of the readout laser beam by means of the light detector 22.

Figure 2:
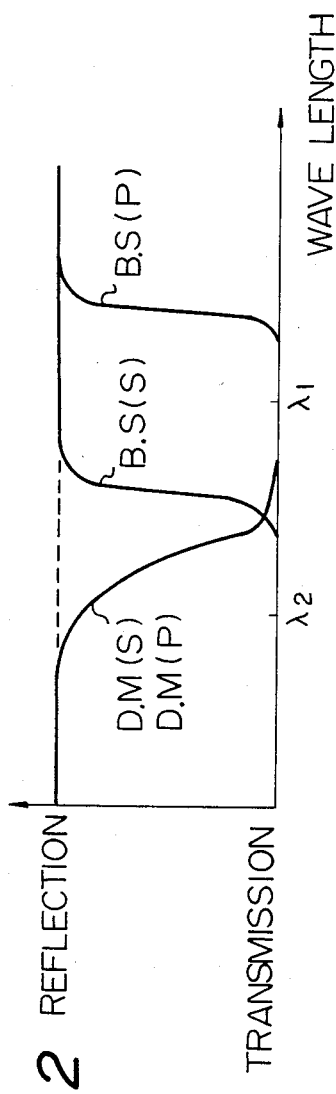
FIG. 2 is a graph showing spectrum characteristics of a beam splitter and a dichroic mirror used in the first embodiment shown in FIG. 1.

FIG. 2 shows the spectrum characteristics of the beam splitter 5 and the dichroic mirror 7.

In FIG. 2, the curves B.S (S) and B.S (P), respectively, show the spectrums of the S wave and the P wave of the polarized light input of the beam splitter 5. Also, the curves D.M (S) and D.M (P) show the S wave and the P wave of the polarized light input of the dichroic mirror 7. In the Figure, signs $\lambda_1$ and $\lambda_2$ designate the wavelengths of the recording laser beam and the readout laser beam, respectively. Thus, by determining the wavelength $\lambda_2$ of the readout laser beam different from the wavelength $\lambda_1$ of the recording laser beam, the recording laser beam and readout laser beam are correctly guided through the dichroic mirror to respective optical paths. In other words, the recording laser beam and readout laser beam are superimposed by means of the dichroic mirror 7, and the reflections thereof are separated also at the dichroic mirror 7. Thus, the tracking mirror, the mirror 8, and the objective lens 9 are used both for recording and for readout purposes.

Furthermore, it is known, in the case of the magneto-optical recording system, that the degree of modulation of a readout signal is maximized when the diameter of the recording beam spot is enlarged as large as the diameter of the readout beam spot. The diameter of the beam spot is proportional to the value of $\lambda/NA$, where NA is the numerical aperture of the objective lens 9, and where λ is the wavelength of the laser beam.

Therefore, if the wavelengths $\lambda_1$ and $\lambda_2$ of the recording and readout beam are selected so that $\lambda_1 > \lambda_2$, then the diameter of the recording beam spot is larger than that of the readout beam spot $$\left(\frac{\lambda_1}{NA} > \frac{\lambda_2}{NA}\right).$$

Thus, the maximum degree of modulation is enabled in the case of this system.

On the other hand, in the case of the optical video disc system in which the signal is recorded in the form of a plurality of pits on the recording track, and interference or diffraction of the readout beam is used to reproduce the recorded signal, it is necessary to limit the width of the pits so that they are narrower than the diameter of the readout beam spot. Therefore, in those systems, a very accurate tracking servo system is required to correctly guide the readout spot on the recording track, in other words, to keep the correct position in the direction of the diameter of the disc.

In this point of view, the system according to the present invention, utilizes an advantageous design of the tracking servo system since the allowable range of the tracking error is relatively greater than the interference optical video system due to the increased diameter of the recording beam spot.

Figure 3B:
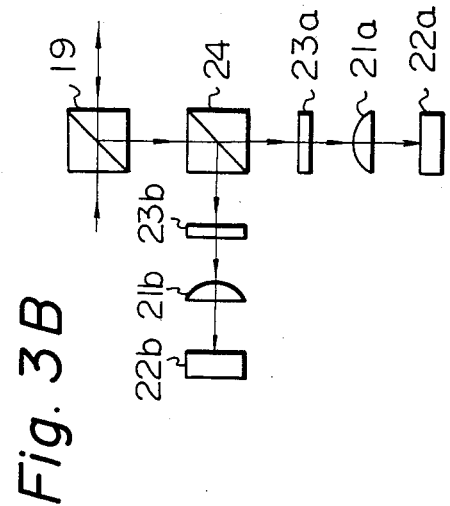
FIGS. 3A and 3B are diagrams showing modifications of the optical passage of the reading out beam shown in FIG. 1.
Figure 3A:
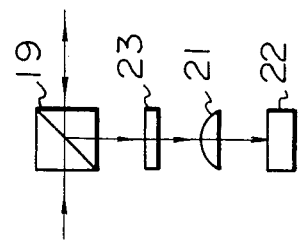

FIGS. 3A and 3B show other examples of optical passages for the readout laser beams.

In FIG. 3A, the readout laser beam, reflected by the beam splitter 19, is directed, through an analyzer 23, to the cylindrical lens 21 and the light detector 22.

In FIG. 3B, the readout laser beam, reflected by the beam splitter 19, is further divided into a first and second readout optical path by means of a beam splitter 24. In the first readout optical path, the readout beam from the beam splitter 24 is directed to first light detector 22a through an analyzer 23a and a cylindrical lens 21a. Similarly, in the second readout optical path, the readout laser beam from the beam splitter 24 is directed to a light detector 22b through an analyzer 23b and a cylindrical lens 21b. In the case of this arrangement, an output signal of a high S/N ratio is obtained by amplifying the output signals of the light detectors 22a and 22b so as to cancel the noise components contained in the output signals of the light detectors.

Figure 4:
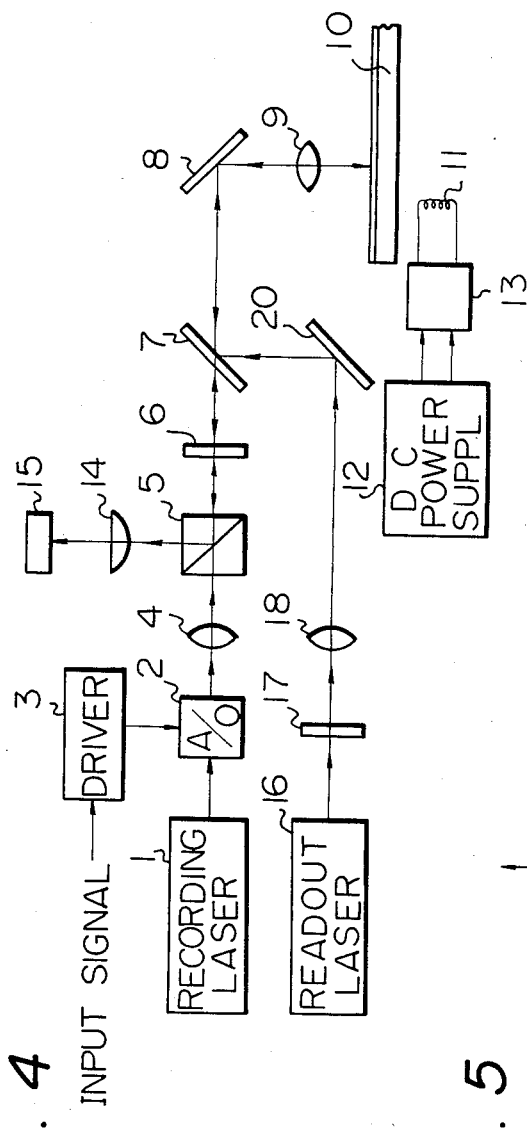
FIG. 4 is a schematic diagram of a second embodiment of the present invention.
Figure 5:
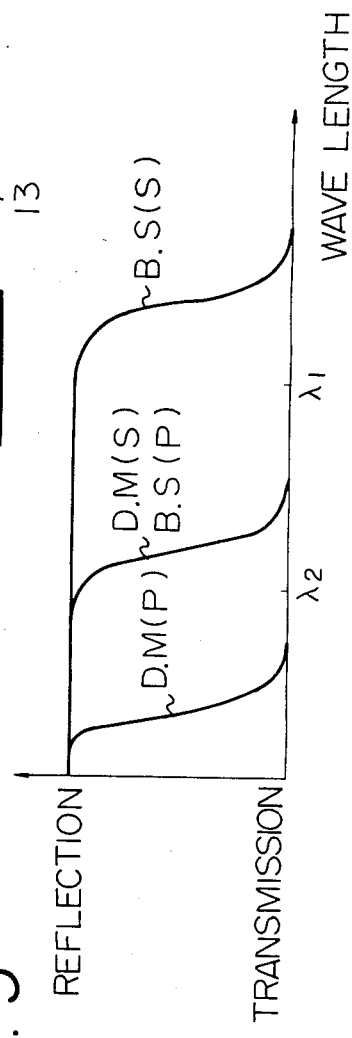
FIG. 5 is a graph showing spectrum characteristics of the beam splitter and the dichroic mirror used in the second embodiment shown in FIG. 4.

Reference is now made to FIG. 4, where the second embodiment of the present invention will be explained. The second embodiment features light detector 15 utilized both for detecting the reflection of the recording laser beam and for detecting the reflection of the readout laser beam. For this purpose, the spectrum characteristics of the beam splitter 5 and the dichroic mirror 7 are selected as shown in FIG. 5, and the reflection of the readout, laser beam from the tracking mirror 8 is directed to the λ/4 plate 6 at the dichroic mirror 7 and then received by the light detector 15 through the beam splitter 5 and the cylindrical lens 14.

It will be appreciated from the foregoing that according to the present invention, an optical system including an objective lens, a tracking mirror and a tangential mirror, for example, can be used both as the optical path of a recording laser beam, and the optical path of a readout laser beam.

Further, the wavelength of the readout laser beam is determined to be shorter than that of the recording laser beam in order to use the dichroic mirror as means of discriminationg between the laser beams.

With the above described features, the construction of the system is simplified, to reduce the size of the system and the cost of manufacturing as well.

Above, preferred embodiments of the present invention have been described. It should be understood, however, that the foregoing description have been illustrative only, and those descriptions are not intended to limit the scope of the invention. Rather, there are numerous equivalents for the preferred embodiments, and such are intended to be covered by the appended claims.

What is claimed is:

1. A system for recording and playing back information utilizing a recording medium having a vertical magnetization film on and from which the information is recorded and readout, the system comprising:

means for rotatably supporting the recording medium;

a source of a recording light beam modulated in accordance with a signal to be recorded;

a source of a readout light beam having a wavelength shorter than a wavelength of said recording light beam;

a focus and tracking optical system including an objective lens;

a first optical path for introducing said recording light beam to said focus and tracking optical system; and a second optical path for introducing said readout light beam to said focus and tracking optical system and for introducing a reflection of said readout light beam from the surface of said vertical magnetization film to a light detector to reproduce the recorded signal, both said recording light beam and readout light beam being focused on the surface of said vertical magnetization film by said objective lens and said recording light beam having a greater diameter on the surface of said vertical magnetization film than said readout light beam.

2. A system as claimed in claim 1, wherein said focus and tracking system includes a dichroic mirror which passes therethrough said recording light beam having a longer wavelength than said readout light beam and which reflects said readout light beam, and said second optical path includes a beam splitter for passing therethrough said readout light beam to direct the same to said dichroic mirror, and for reflecting said reflection of readout light beam to direct the same to a light detector which is provided for playing back the recorded information.

3. A system as claimed in claim 1, wherein said focus and tracking system includes a dichroic mirror which passes therethrough said recording light beam having a longer wavelength than said readout light beam and passes said reflection of readout light beam and which reflects said readout light beam, and said first optical path includes a beam splitter for passing therethrough said recording light beam to direct the same to said dichroic mirror, and for reflecting a reflection of recording light beam reflected by said vertical magnetization film and for reflecting said reflection of readout light beam to direct them to a light detector which is provided for producing a focus servo signal and for playing back the recorded information.

* * * * *